(12) United States Patent
Lim et al.

(10) Patent No.: US 11,530,039 B2
(45) Date of Patent: Dec. 20, 2022

(54) APPARATUS FOR ASSISTING FORMATION FLIGHT OF UNMANNED AERIAL VEHICLE

(71) Applicants: PABLO AIR Co., Ltd., Incheon (KR); PABLO AIR International, INC., Phoenix, AZ (US)

(72) Inventors: Seung Han Lim, Daejeon (KR); Youngjoon Kim, Incheon (KR)

(73) Assignees: PABLO AIR Co., Ltd., Incheon (KR); PABLO AIR International, INC., Phoenix, AZ (US)

( * ) Notice: Subject to any disclaimer, the term of this patent is extended or adjusted under 35 U.S.C. 154(b) by 0 days.

(21) Appl. No.: 17/519,463

(22) Filed: Nov. 4, 2021

(65) Prior Publication Data

US 2022/0289374 A1    Sep. 15, 2022

(30) Foreign Application Priority Data

Mar. 9, 2021 (KR) .................. 10-2021-0030746

(51) Int. Cl.
 *B64C 29/02* (2006.01)
 *B64C 39/02* (2006.01)
 *B64D 9/00* (2006.01)

(52) U.S. Cl.
 CPC .............. *B64C 39/024* (2013.01); *B64D 9/00* (2013.01); *B64C 2201/027* (2013.01)

(58) Field of Classification Search
 CPC ... B64C 39/024; B64C 2201/027; B64D 9/00; G05D 1/104; G05D 1/0027
 See application file for complete search history.

(56) References Cited

U.S. PATENT DOCUMENTS

| 3,591,121 | A  | * | 7/1971  | Parris ................ | B65D 19/0002 |
|-----------|----|---|---------|-------------------------|--------------|
|           |    |   |         |                         | 248/346.02   |
| 9,205,922 | B1 | * | 12/2015 | Bouwer ................. | B64C 37/02   |
| 9,457,899 | B2 | * | 10/2016 | Duffy ................... | B64C 37/02   |
| 9,505,493 | B2 | * | 11/2016 | Borko ................... | B64F 1/0297  |
| 9,957,045 | B1 | * | 5/2018  | Daly ..................... | B64C 37/02   |
| 10,173,775| B2 | * | 1/2019  | Samaritano ........... | B64C 39/026  |
| 10,293,936| B1 | * | 5/2019  | Conn .................... | B64C 37/02   |
| 10,303,415| B1 | * | 5/2019  | Ananthanarayanan ..................... | G09G 3/001 |

(Continued)

FOREIGN PATENT DOCUMENTS

| KR | 10-1475629 B1 | 12/2014 |
| KR | 10-1840473 B1 | 3/2018 |

(Continued)

*Primary Examiner* — Medhat Badawi
(74) *Attorney, Agent, or Firm* — Studebaker & Brackett PC

(57) ABSTRACT

Provided is an apparatus for assisting formation flight. The apparatus comprises a formation maintaining member for maintaining formation of a plurality of unmanned aerial vehicles in flight and having connection points formed at points corresponding to positions of each unmanned aerial vehicle on the formation, and a plurality of fastening members, in which one end is connected to the connection points of the formation maintaining member and the other end is fastened to the unmanned aerial vehicle to connect the formation maintaining member and the plurality of unmanned aerial vehicles, wherein a movement permitting member for permitting a posture change of the unmanned aerial vehicle within a predetermined range is formed on the other end of the plurality of fastening members.

7 Claims, 11 Drawing Sheets

(56) References Cited

U.S. PATENT DOCUMENTS

| | | | |
|---|---|---|---|
| 10,310,501 B2* | 6/2019 | Greenberger | H02J 7/342 |
| 10,577,098 B2* | 3/2020 | Chang | B64C 37/02 |
| 10,717,528 B1* | 7/2020 | Tran | G06Q 10/0835 |
| 10,759,532 B2* | 9/2020 | Zhang | B64C 39/024 |
| 10,766,610 B2* | 9/2020 | Kidakarn | B64C 27/006 |
| 11,021,223 B2* | 6/2021 | Fikes | B64G 1/443 |
| 11,148,808 B2* | 10/2021 | Wiggerich | B64D 1/22 |
| 11,190,032 B2* | 11/2021 | Farrahi Moghaddam | H02J 7/0013 |
| 2010/0200695 A1* | 8/2010 | Tsakiris | B64C 1/20 410/101 |
| 2016/0244160 A1* | 8/2016 | Colten | B60F 5/02 |
| 2016/0304217 A1* | 10/2016 | Fisher | B60L 53/51 |
| 2016/0311526 A1* | 10/2016 | Geise | B64C 27/52 |
| 2016/0378108 A1* | 12/2016 | Paczan | B64D 31/06 705/330 |
| 2018/0148169 A1* | 5/2018 | Zhang | B64C 19/00 |
| 2018/0188724 A1* | 7/2018 | Jassowski | G05D 1/0027 |
| 2019/0047698 A1* | 2/2019 | Jassowski | B64C 39/024 |
| 2020/0108923 A1* | 4/2020 | Smith | B64C 39/024 |
| 2020/0207475 A1* | 7/2020 | Dobberfuhl | B65G 67/00 |
| 2020/0233411 A1* | 7/2020 | Ivanov | G05D 1/0027 |
| 2020/0320886 A1* | 10/2020 | Zhou | G08G 5/0039 |
| 2020/0406773 A1* | 12/2020 | Lacaze | G05D 1/0094 |
| 2021/0302613 A1* | 9/2021 | Wu | G01V 3/12 |
| 2021/0354819 A1* | 11/2021 | Hiller | H02J 50/80 |
| 2021/0354820 A1* | 11/2021 | Hiller | G05D 1/104 |
| 2021/0387711 A1* | 12/2021 | Braam | B64C 1/064 |
| 2021/0403146 A1* | 12/2021 | Atsumi | B64C 17/02 |
| 2022/0063802 A1* | 3/2022 | Komerath | B64C 37/02 |

FOREIGN PATENT DOCUMENTS

| | | |
|---|---|---|
| KR | 10-2018-0076997 A | 7/2018 |
| KR | 10-2018-0128703 A | 12/2018 |
| KR | 10-2191852 B1 | 12/2020 |
| WO | 2019/079100 A1 | 4/2019 |

* cited by examiner

APPARATUS FOR ASSISTING FORMATION FLIGHT OF UNMANNED AERIAL VEHICLE

This application claims the benefit of Korean Patent Application No. 10-2021-0030746, filed on Mar. 9, 2021, in the Korean Intellectual Property Office, the disclosure of which is incorporated herein by reference in its entirety.

BACKGROUND

1. Field

The present disclosure relates to an unmanned aerial vehicle formation flight assisting apparatus. More particularly, it relates to a formation flight assisting apparatus that assists a plurality of unmanned aerial vehicles to fly in formation while maintaining a constant formation.

2. Description of the Related Art

Today, unmanned aerial vehicles such as drones are being used in various fields. For example, unmanned aerial vehicles are being used in the broadcasting field, agriculture field, military field, delivery field and the like. Furthermore, research on formation flight of a plurality of unmanned aerial vehicles is being actively conducted. The formation flight of unmanned aerial vehicles is actually being used in drone air shows.

In the formation flight of unmanned aerial vehicles, it is important that each unmanned aerial vehicle does not collide and maintains a constant formation. In addition, in the formation flight of the unmanned aerial vehicle, all aerial vehicles in the formation flight should be controlled simultaneously according to one command. However, in order to control all of the plurality of unmanned aerial vehicles in formation flight, high-performance unmanned aerial vehicles and complex formation flight control algorithms are required, and the processing burden of the control server for controlling all of the plurality of unmanned aerial vehicles is also significant. When such a high-performance unmanned aerial vehicle and a complex flight control algorithm are required, the construction cost of the formation flight control system may increase.

Accordingly, there is a need for a technology capable of efficiently assisting the formation flight of unmanned aerial vehicles while reducing costs.

SUMMARY

The technical problem to be solved by the present disclosure is to provide an unmanned aerial vehicle formation flight assisting apparatus that saves cost and enables the formation flight of unmanned aerial vehicles in a simple way.

Another technical problem to be solved by the present disclosure is to provide a formation flight assisting apparatus that ensures the stability of an unmanned aerial vehicle in formation fight.

Another technical problem to be solved by the present disclosure is to provide a formation flight assisting apparatus capable of delivering goods through formation flight.

The technical problems of the present disclosure are not limited to the technical problems mentioned above, and other technical problems not mentioned will be clearly understood by those skilled in the art from the following description.

According to an embodiment, an apparatus for assisting formation flight may include a formation maintaining member for maintaining formation of a plurality of unmanned aerial vehicles in flight and having connection points formed at points corresponding to positions of each unmanned aerial vehicle on the formation, and a plurality of fastening members, in which one end is connected to the connection points of the formation maintaining member and the other end is fastened to the unmanned aerial vehicle to connect the formation maintaining member and the plurality of unmanned aerial vehicles, wherein a movement permitting member for permitting a posture change of the unmanned aerial vehicle within a predetermined range is formed on the other end of the plurality of fastening members.

According to an embodiment, wherein the goods loading unit may include a seating surface having an edge of the formation maintaining member as an outer edge, on which the goods are seated.

According to an embodiment, wherein the goods loading unit further may include a plurality of sidewalls formed between adjacent fastening members.

According to an embodiment, the formation maintaining member may have a regular polygonal shape, and the connection point may be formed at each vertex of a regular polygon.

According to an embodiment, wherein the movement permitting member may be a ball joint, wherein the unmanned aerial vehicle and the fastening member may be fastened by coupling using the ball joint.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the attached drawings.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

Figure 1:
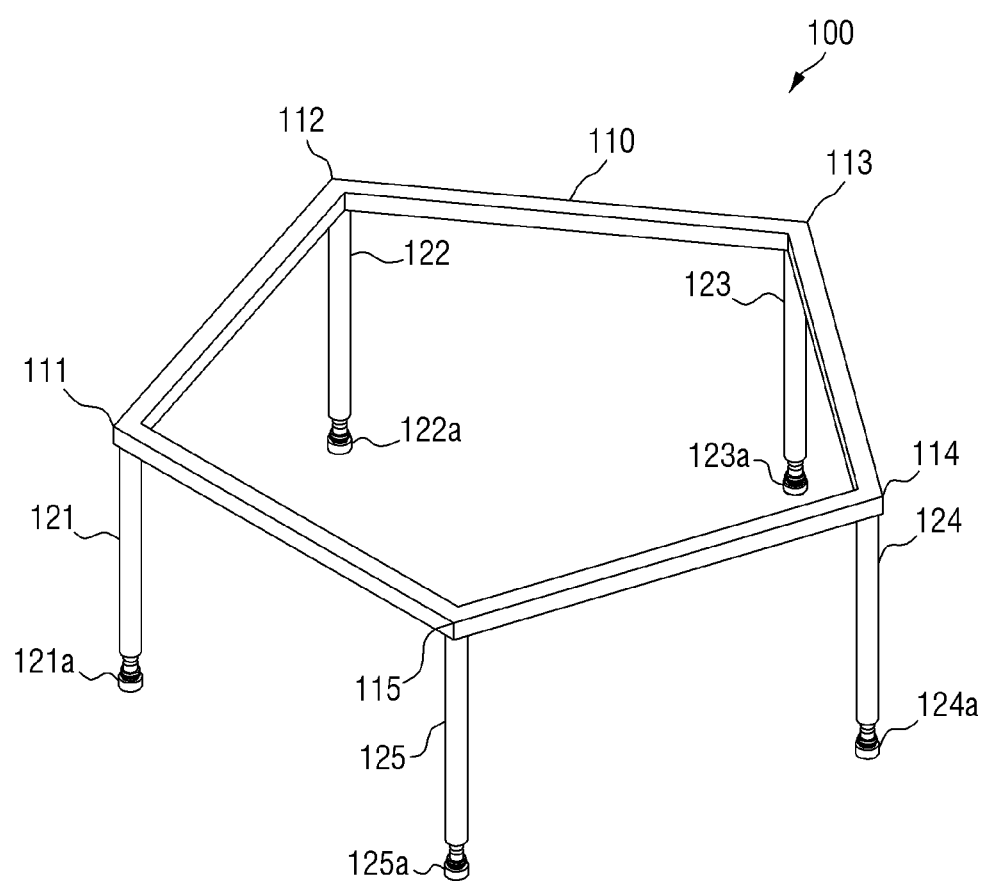
FIG. 1 is a perspective view of a formation flight assisting device according to an embodiment of the present disclosure.

FIG. 1 is a perspective view of a formation flight assisting device according to an embodiment of the present disclosure.

Figure 2:
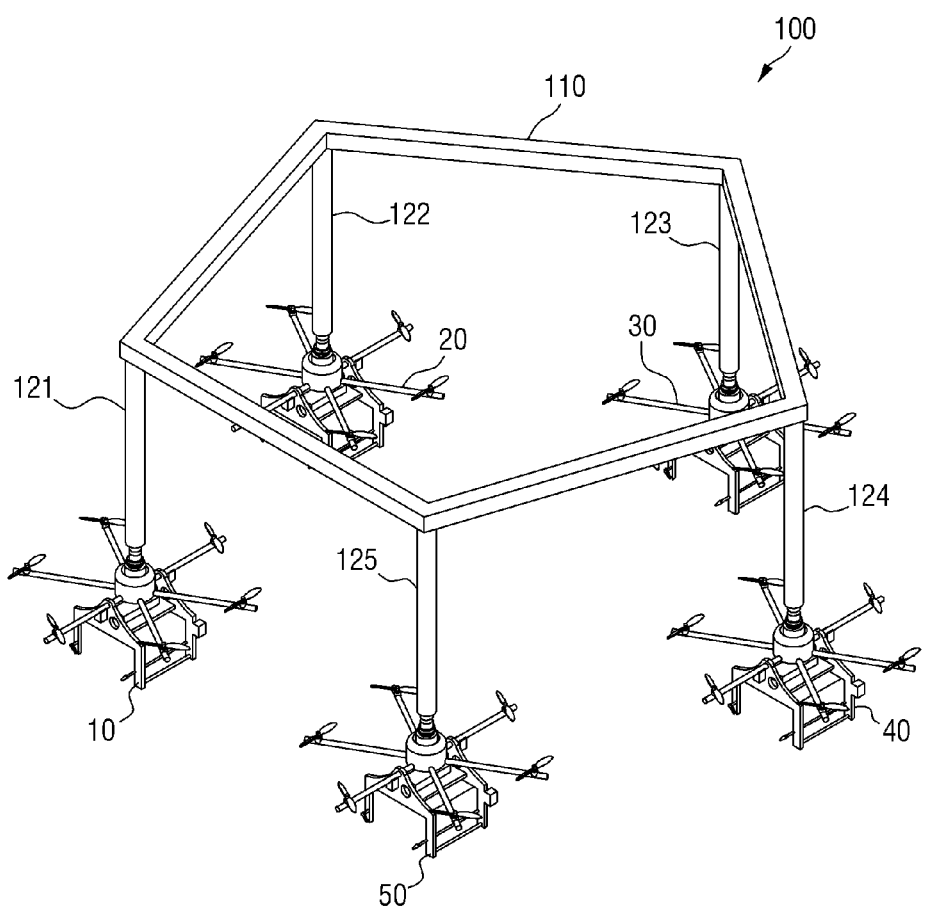
FIG. 2 is a view illustrating a state, in which a plurality of unmanned aerial vehicles are connected to the formation flight assisting device of FIG. 1.

FIG. 2 is a view illustrating a state, in which a plurality of unmanned aerial vehicles are connected to the formation flight assisting device of FIG. 1.

Referring to FIGS. 1 and 2, the formation flight assisting device 100 may comprise a formation maintaining member 110 for maintaining the formation of a plurality of unmanned aerial vehicles 10 to 50 and a plurality of fastening members 121 to 125, in which one end is connected to the formation maintaining member 110 and the other end is fastened to the plurality of unmanned aerial vehicles 10 to 50.

The formation maintaining member 110 may be formed in a predetermined shape. In one embodiment, the formation maintaining member 110 may have a regular polygonal shape. In another embodiment, the formation maintaining member 110 may have a circular shape (see FIG. 11). In some embodiments, the formation maintaining member 110 may have the shape of an umbrella spokes (see FIG. 10), a straight shape (see FIG. 9), or a V-shape (not shown), and may be manufactured in various other shapes. The formation maintaining member 110 may have a predetermined thickness, and may be formed of a material that is light and strong against impact.

The formation maintaining member 110 may have connection points 111 to 115 corresponding to the positions of the formation of the unmanned aerial vehicles 10 to 50. The connection points 111 to 115 may be spaced apart from each other at regular intervals. In an embodiment, when the formation maintaining member 110 has a regular polygonal shape, connection points 111 to 115 may be formed at each vertex of the regular polygon. As illustrated in FIG. 1, connection points 111 to 115 may be formed at each vertex of the formation maintaining member 110 having a regular polygonal shape.

One end of each fastening member 121 to 125 is connected to the connection points 111 to 115 of the formation maintaining member 110 and the other end is fastened to the unmanned aerial vehicles 10 to 50, so that the formation maintaining member 110 and the unmanned aerial vehicles 10 to 50 may be connected by the fastening members 121 to 125. The fastening members 121 to 125 may be formed to have a predetermined length, and a fastening means for fastening with the unmanned aerial vehicles 10 to 50 may be provided at the other end of the fastening members 121 to 125. In addition, the fastening members 121 to 125 may have a predetermined thickness and may be formed of a material that is light and strong against impact.

As illustrated in FIG. 2, in one embodiment, each of the fastening members 121 to 125 may extend in a downward direction from the corresponding connection points 111 to 115, and be fastened to the unmanned aerial vehicles 10 to 50 located below the formation maintaining member 110.

In another embodiment, each of the fastening members 121 to 125 may extend in an upward direction from the corresponding connection points 111 to 115, and be fastened to the unmanned aerial vehicles 10 to 50 located above the formation maintaining member 110.

Figure 3:
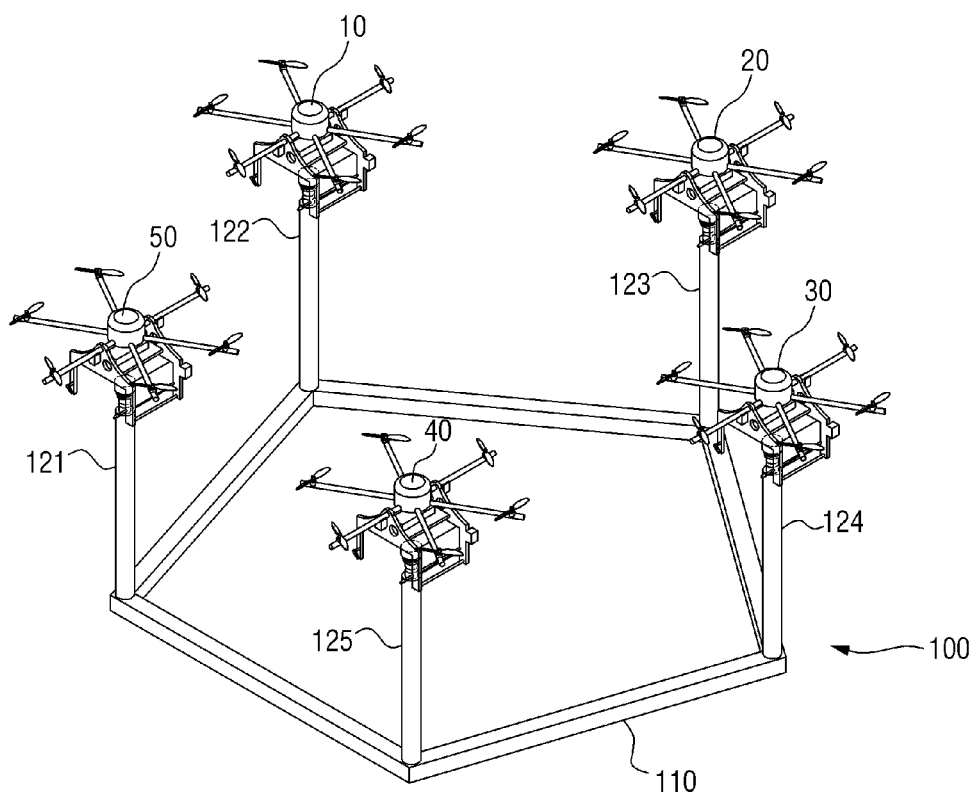
FIG. 3 is a diagram illustrating a coupling state of a formation flight assisting device and an unmanned aerial vehicle according to another embodiment of the present disclosure.

FIG. 3 is a view illustrating a coupling state of a formation flight assisting device and an unmanned aerial vehicle according to another embodiment of the present disclosure, and as illustrated in FIG. 3, the fastening members 121 to 125 may extend in an upward direction, and be fastened to the unmanned aerial vehicles 10 to 50 located above the formation maintaining member 110.

According to the above-described embodiments, the unmanned aerial vehicles 10 to 50 may perform formation flight in a state of connecting to the formation flight assisting device 100. Accordingly, without requiring a separate algorithm and high-performance unmanned aerial vehicle, it is possible to exhibit the effect of stably assisting the formation flight of the unmanned aerial vehicles 10 to 50 at a low cost.

As another embodiment, the formation flight assisting device 100 may further include a goods loading unit 130.

Figure 4:
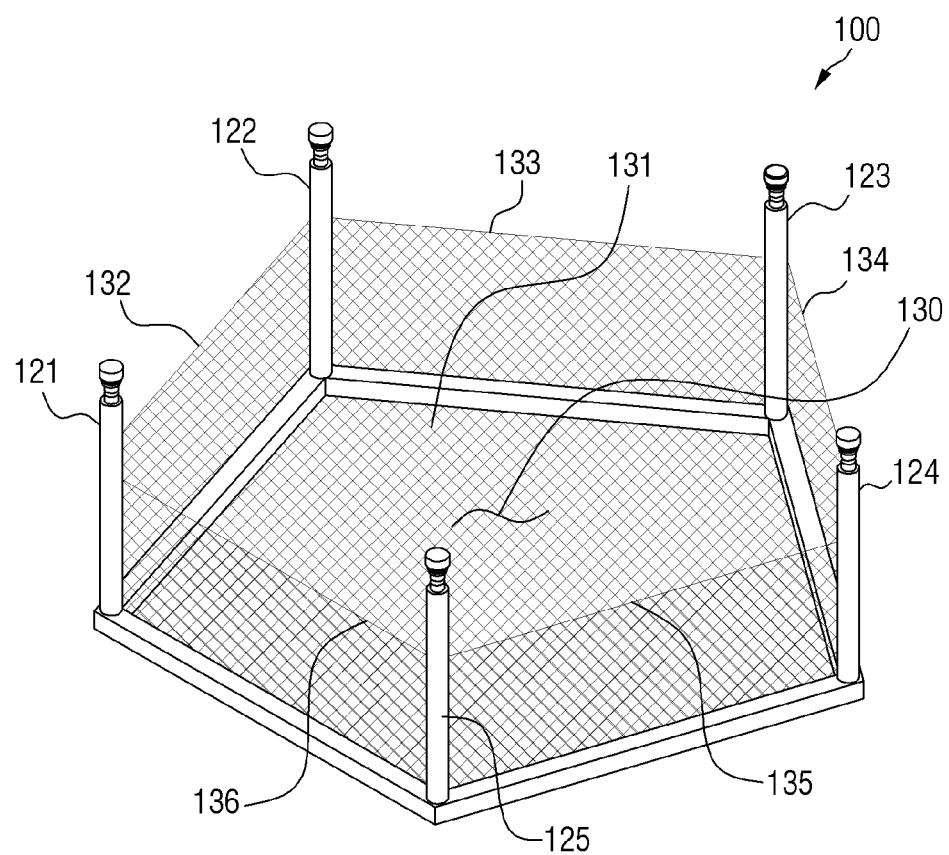
FIG. 4 is a perspective view of a formation flight assisting device according to another embodiment of the present disclosure.

FIG. 4 is a perspective view of a formation flight assisting device according to another embodiment of the present disclosure.

Figure 5:
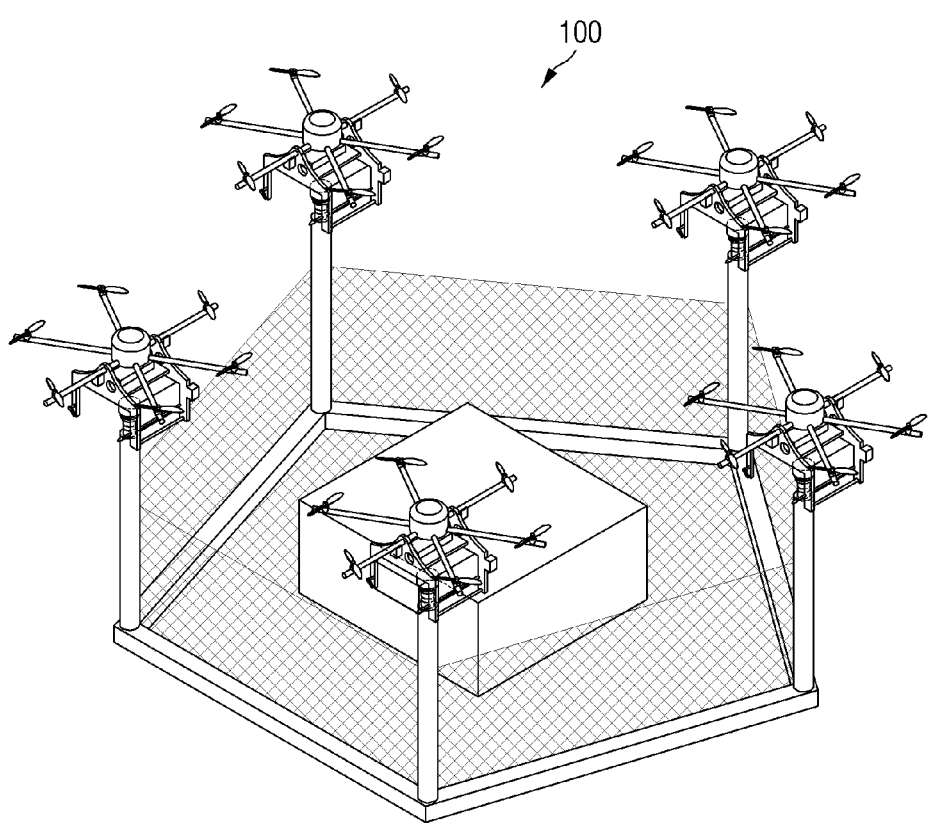
FIG. 5 is a view illustrating a state, in which the goods are loaded in the formation flight assisting device of FIG. 4.

FIG. 5 is a view illustrating a state, in which the goods are loaded in the formation flight assisting device of FIG. 4.

Referring to FIG. 4, the formation flight assisting device 100 may further include a goods loading unit 130, in which goods are seated and loaded. The goods loading unit 130 may include a seating surface 131, on which the goods are seared, and a plurality of sidewalls 132 to 136 for preventing the goods from falling. The seating surface 131 of the goods loading unit 130 is a lower surface with the edge of the formation maintaining member 110 as an outer edge, and may be formed in a net shape to minimize air resistance. In addition, the sidewalls 132 to 136 of the goods loading unit 130 are formed between the adjacent fastening members 121 to 125 and may be formed in a net shape to minimize air resistance. That is, the first sidewall 132 in a net shape may be formed between the first fastening member 121 and the second fastening member 122, and the second sidewall 133 may be formed between the second fastening member 122 and the third fastening member 123. In addition, the third sidewall 134 in a net shape may be formed between the third fastening member 123 and the fourth fastening member 124, the fourth sidewall 135 may be formed between the fourth fastening member 124 and the fifth fastening member 125, and the fifth sidewall 136 may be formed between the first fastening member 124 and the fifth fastening member 125.

After the goods are loaded in the goods loading unit 130 including the seating surface 131 and the sidewalls 132 to 136, the goods may be delivered to a designated destination by the formation flight of a plurality of unmanned aerial vehicles 10 to 50. According to the present embodiment, since the plurality of unmanned aerial vehicles 10 to 50 deliver goods together, it is possible to deliver heavy goods as well.

On the other hand, a movement permitting members 121a to 125a that permit the posture change (e.g., change of roll, pitch, yaw, etc.) of the unmanned aerial vehicles 10 to 50 within a predetermined range and are fastened to the unmanned aerial vehicles 10 to 50 may be formed on the other end of the fastening members 121 to 125. The predetermined range may be a range, in which collisions between adjacent unmanned aerial vehicles 10 to 50 do not occur.

In an embodiment, the movement permitting members 121a to 125a may be a ball joint. As illustrated in FIGS. 1 to 5, as the movement permitting members 121a to 125a, ball joints 121a to 125a may be provided on the other ends of the fastening members 121 to 125. The ball joints 121a-125a are structures that allow the ball part to rotate freely within the casing, and the unmanned aerial vehicles 10 to 50 can change its posture within a permitting range by the ball joints 121a to 125a. In other words, the ball joints 121a to 125a can rotate within a predetermined azimuth, and accordingly, the unmanned aerial vehicles 10 to 50 fastened to the ball joints 121a to 125a can move within the azimuth or change their posture. According to the present embodiment, the ball joints 121a to 125a may be provided with a coupling protrusion member 121b for being coupled to the unmanned aerial vehicles 10 to 50, and the unmanned aerial vehicle 10 to 50 may be provided with the coupling groove 11 corresponding to the coupling protrusion member 121b. In some other embodiments, the unmanned aerial vehicles 10 to 50 may be provided with a coupling protrusion member for coupling with the movement permitting members 121a to 125a, and the movement permitting members 121a to 125a may be provided with a coupling groove corresponding to the coupling protrusion member.

Figure 6:
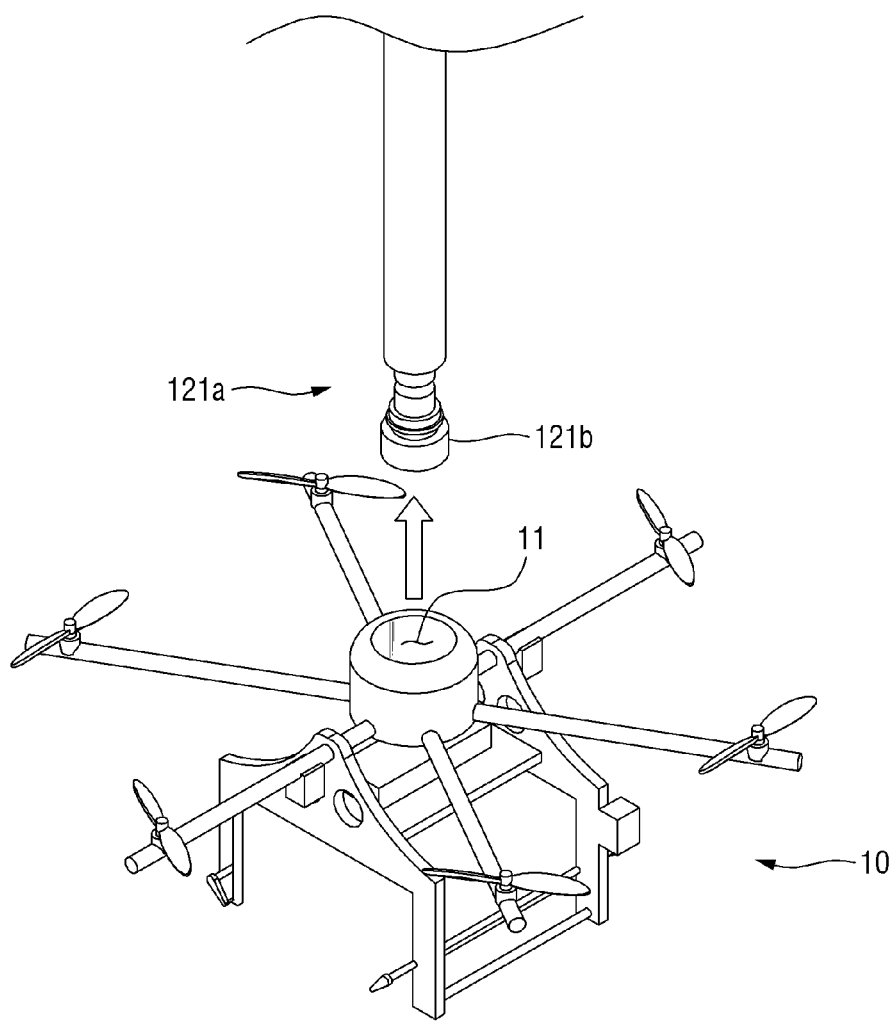
FIG. 6 is a view illustrating a coupling protrusion member of the first ball joint and a coupling groove of the first unmanned aerial vehicle.

FIG. 6 is a view illustrating a coupling protrusion member of the first ball joint and a coupling groove of the first unmanned aerial vehicle, and as illustrated in FIG. 6, the coupling protrusion member 121b of the first ball joint 121a is inserted into the coupling groove 11 of the first unmanned aerial vehicle 10 to be fastened with each other. That is, the coupling protrusion member 121b of the first ball joint 121a and the coupling groove 11 of the first unmanned aerial vehicle 10 may be fastened with each other in a fitting manner. In other words, a coupling protrusion member is provided in each of the ball joints 121a to 125a, and a coupling groove is provided on the upper or lower surface of the main body of each unmanned aerial vehicle 10 to 50, and the coupling protrusion member of the ball joints 121a to 125a may be inserted into the coupling groove of the corresponding unmanned aerial vehicle 10 to 50, so that the plurality of unmanned aerial vehicles 10 to 50 may be connected to the formation flight assisting device 100. In another embodiment, the ball joints 121a to 125a may be provided with a coupling groove, and correspondingly, the unmanned aerial vehicles 10 to 50 may be provided with a coupling protrusion member, and the coupling grooves of the ball joints 121a to 125a and the coupling protrusion members of the unmanned aerial vehicles 10 to 50 may be fastened with each other in a fitting manner.

As another embodiment, the movement permitting members 121a to 125a may include a ring.

Figure 7:
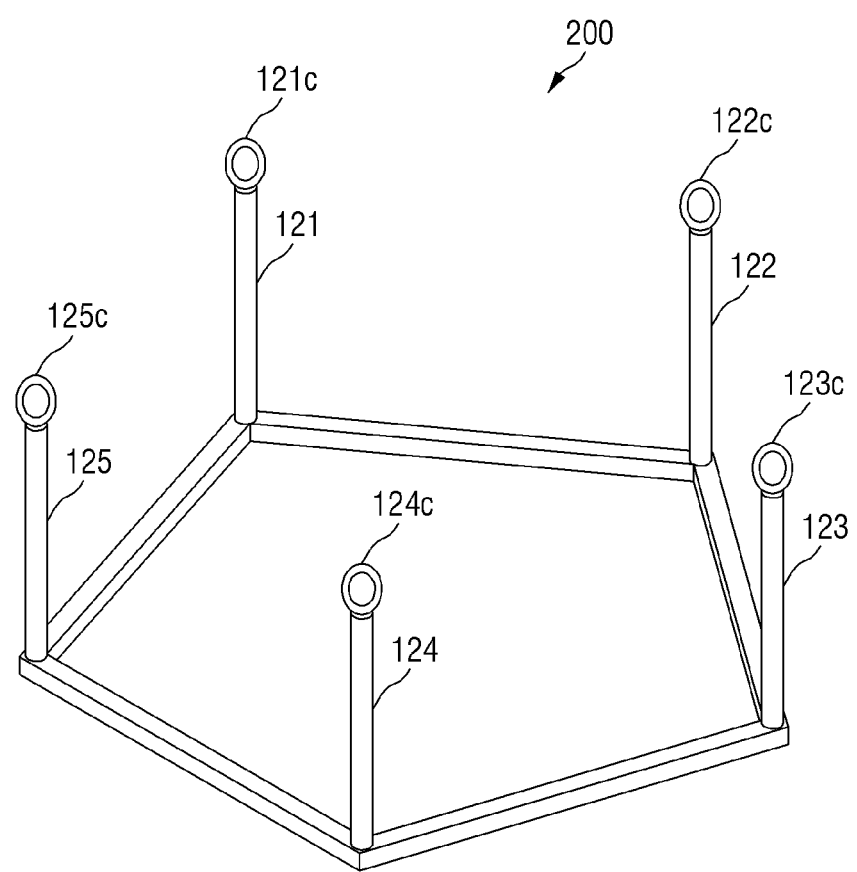
FIG. 7 is a perspective view of a formation flight assisting device according to another embodiment of the present disclosure.

FIG. 7 is a perspective view of a formation flight assisting device according to another embodiment of the present disclosure.

Figure 8:
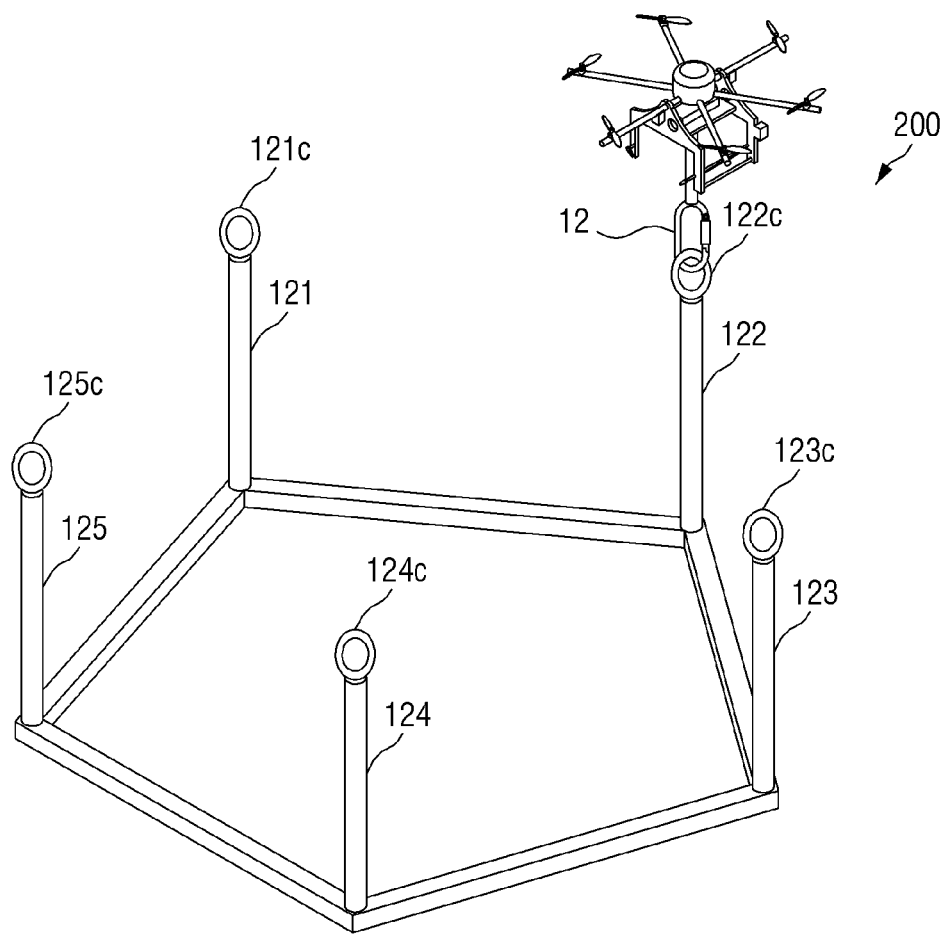
FIG. 8 is a diagram illustrating an unmanned aerial vehicle connected to the formation flight assisting device of FIG. 7.

FIG. 8 is a diagram illustrating an unmanned aerial vehicle connected to the formation flight assisting device of FIG. 7.

Referring to FIGS. 7 and 8, the formation flight assisting device 200 according to another embodiment of the present disclosure may be provided with rings 121c to 125c as a movement permitting member at the other end of the fastening members 121 to 125.

The rings 121c to 125c have a structure of hollow inside that can move within a predetermined range at the end of the fastening members 121 to 125, and the unmanned aerial vehicle can change in the posture within the permitting range by the rings 121c to 125c. In other words, the rings 121c to 125c may be moved within a predetermined azimuth, and accordingly, the unmanned aerial vehicles 10 to 50 coupled with the rings 121c to 125c may move within the azimuth or change their posture. According to this embodiment, a fastening ring 12 for coupling with the rings 121c to 125c may be provided in the unmanned aerial vehicle.

As illustrated in FIG. 8, the second ring 122c provided at the other end of the second fastening member 122 and the fastening ring 12 provided in the unmanned aerial vehicle may be coupled in a chain form. As such, the fastening ring 12 provided in each unmanned aerial vehicle and the rings 121c to 125c provided in each fastening member 121 to 125 are chain-coupled, so that a plurality of unmanned aerial vehicles 10 to 50 may be connected to the formation flight assisting device 100.

As another embodiment, the movement permitting members 121a to 125a may be elastic members having a predetermined elastic force. For example, the elastic member may be an elastic fastening member including a spring, an elastic fastening member including rubber, and the like, which can be changed in shape by a predetermined force. In other words, in another embodiment, an elastic member having a predetermined elastic force and having a form that can be fastened to the unmanned aerial vehicle may be used as the movement permitting members 121a to 125a. For example, an elastic rope is used as the movement permitting members 121a to 125a, and the unmanned aerial vehicle 10 to 50 and the fastening members 121 to 125 may be fastened with each other.

According to the above-described embodiments, through the movement permitting members 121a to 125a provided in the formation flight assisting devices 100, 200, the unmanned aerial vehicle can change the posture within a permitting range to take a stable posture during formation flight.

On the other hand, in the above-described embodiment, the formation maintaining member is exemplified as a regular polygon, but the formation maintaining member may be implemented in various shapes.

Figure 9:
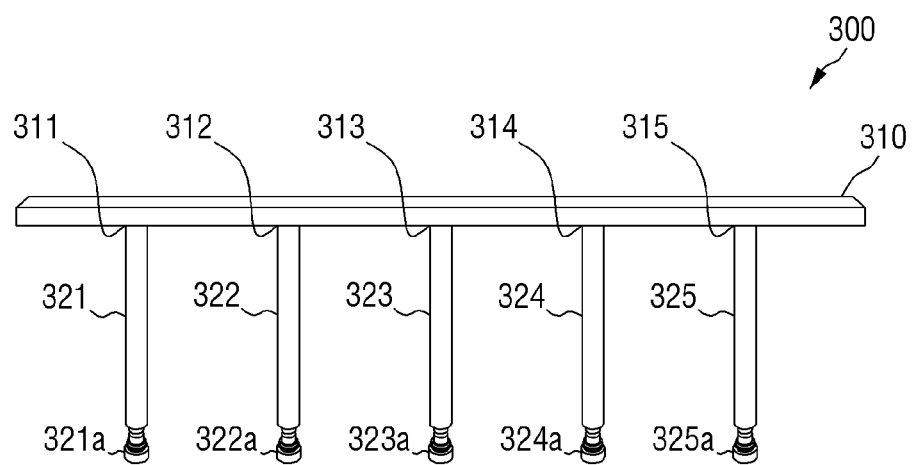
FIGS. 9 to 11 are diagrams illustrating various types of formation flight assisting devices according to another embodiment of the present disclosure.

FIG. 9 is a view showing a formation flight assisting device according to another embodiment of the present disclosure.

As illustrated in FIG. 9, the formation flight assisting device 300 may comprise a formation maintaining member 310 for maintaining the formation of a plurality of unmanned aerial vehicles 10 to 50 and a plurality of fastening members 321 to 325, in which one end is connected to the formation maintaining member 310 and the other end is fastened to a plurality of unmanned aerial vehicles 10 to 50.

According to the present embodiment, the formation maintaining member 310 may have a straight shape. The formation maintaining member 310 may have a predetermined thickness and may be formed of a material that is light and strong against impact. The formation maintaining member 310 may have connection points 311 to 315 corresponding to the positions of the formation of the unmanned aerial vehicles 10 to 50. The connection points 311 to 315 may be spaced apart from each other at regular intervals.

One end of each fastening member 321 to 325 is connected to the connection points 311 to 315 of the formation maintaining member 310, and the other end is fastened to the unmanned aerial vehicle 10 to 50, so that the formation maintaining member 310 and the plurality of unmanned aerial vehicles 10 to 50 may be connected by the fastening members 321 to 325. The fastening members 321 to 325 may be formed to have a predetermined length. In addition, the fastening members 321 to 325 may have a predetermined thickness, and may be formed of a material that is light and strong against impact. On the other end of the fastening member 321 to 325, movement permitting members 321a to 325a that permit a change in the posture of the unmanned aerial vehicles 10 to 50 within a predetermined range and are fastened with the unmanned aerial vehicles 10 to 50 may be formed. In FIG. 9, the movement permitting members 321a to 325a are exemplified as a ball joint, but a ring, an elastic member, or the like may be used as the movement permitting members 321a to 325a. Meanwhile, in FIG. 9, the fastening members 321 to 325 are exemplified as extending in the downward direction, but the fastening members 321 to 325 may extend in the upward direction and be fastened to the unmanned aerial vehicles 10 to 50 located at the upper portion.

Figure 10:
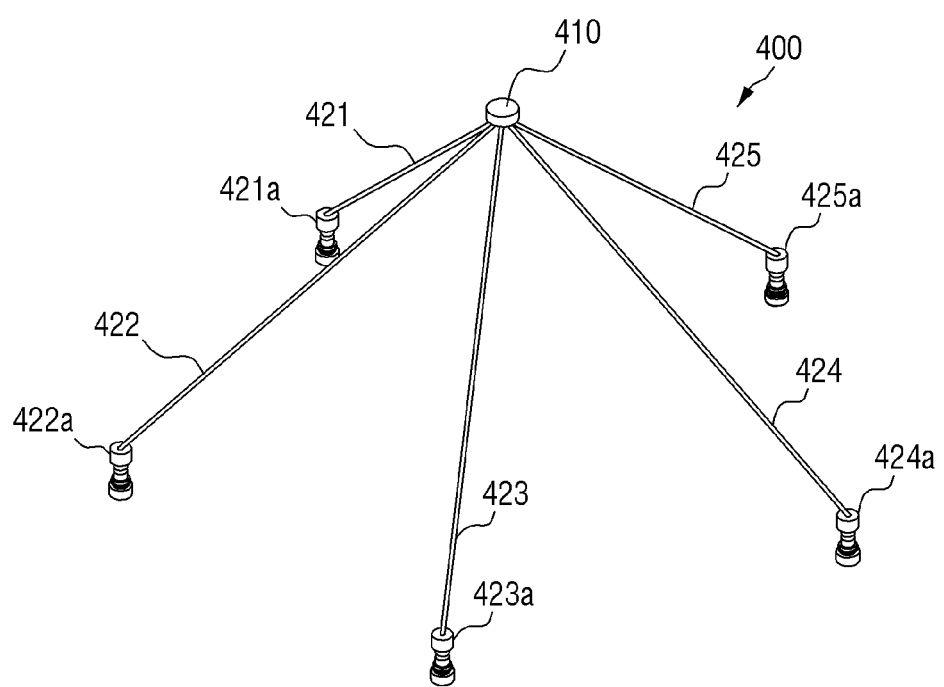

FIG. 10 is a view showing a formation flight assisting device according to another embodiment of the present disclosure.

As illustrated in FIG. 10, the formation flight assisting device 400 may comprise a formation maintaining member 410 for maintaining the formation of a plurality of unmanned aerial vehicles 10 to 50 and a plurality of fastening members 421 to 425, in which one end is connected to the formation maintaining member 410 and the other end is fastened to a plurality of unmanned aerial vehicles 10 to 50.

According to this embodiment, the formation maintaining member 410 may have a circular shape. Further, in addition to the circular shape, the formation maintaining member 410 may have various shapes capable of consolidating one end of the fastening member. The formation maintaining member 410 may have connection points (not shown in the drawing) corresponding to the positions of the formation of the unmanned aerial vehicles 10 to 50. The connection points may be spaced apart from each other at a predetermined azimuth.

One end of each fastening member 421 to 425 is connected to the connection point of the formation maintaining member 410, and the other end is fastened to the unmanned aerial vehicles 10 to 50, so that the formation maintaining member 410 and the plurality of unmanned aerial vehicles 10 to 50 may be connected by the fastening members 421 to 425. The fastening members 421 to 425 may be formed to have a predetermined length. On the other end of the fastening member 421 to 425, movement permitting members 321a to 325a that permit a change in the posture of the unmanned aerial vehicles 10 to 50 within a predetermined range and are fastened with the unmanned aerial vehicles 10 to 50 may be formed. In FIG. 10, the movement permitting members 421a to 425a are exemplified as a ball joint, but a ring, an elastic member, or the like may be used as the movement permitting members 421a to 425a. Meanwhile, in FIG. 10, the fastening members 421 to 425 are exemplified as extending in the downward direction, but the fastening members 421 to 425 may extend in the upward direction and be fastened to the unmanned aerial vehicles 10 to 50 located at the upper portion.

Figure 11:
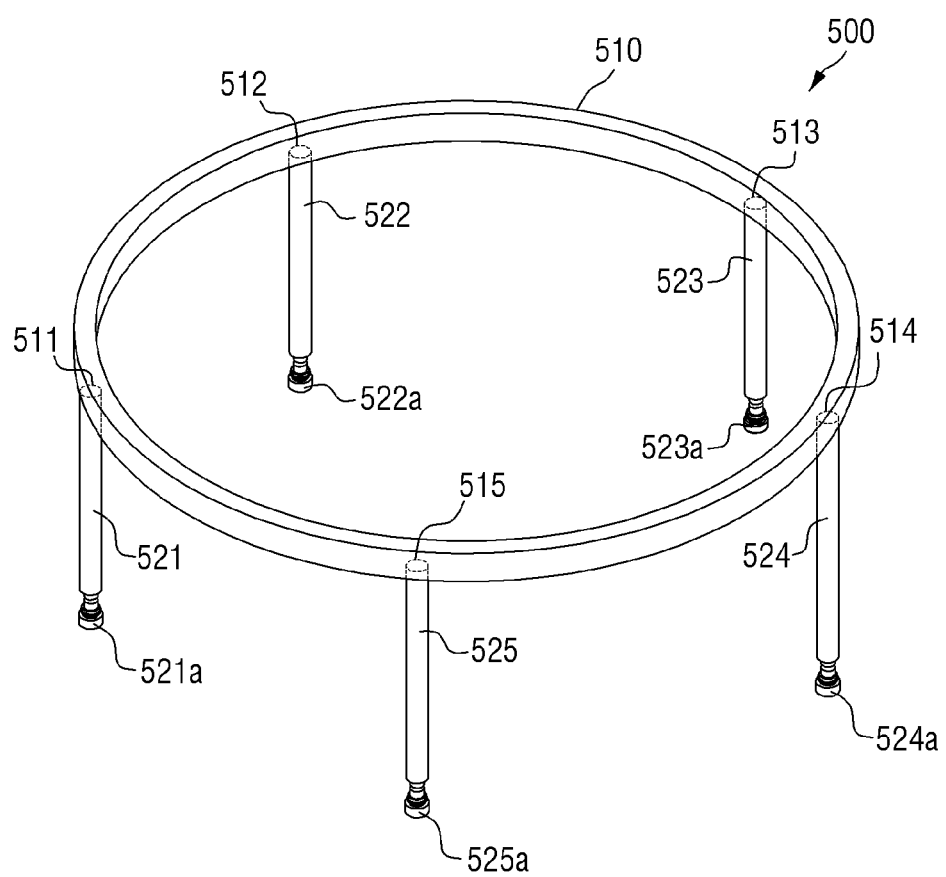

FIG. 11 is a diagram illustrating a formation flight assisting device according to another embodiment of the present disclosure.

As illustrated in FIG. 11, the formation flight assisting device 500 may comprise a formation maintaining member 510 of a circular shape, and a plurality of fastening members 521 to 525, in which one end is connected to the formation maintaining member 510 and the other end is fastened to a plurality of unmanned aerial vehicles 10 to 50.

The formation maintaining member 510 according to the present embodiment has a circular shape. The formation maintaining member 510 may have connection points 511 to 515 corresponding to the positions of the unmanned aerial vehicle 10 to 50. The connection points 511 to 515 may be spaced apart from each other at regular intervals.

One end of each fastening member 521 to 525 may be connected to the connection points 511 to 515 of the formation maintaining member 510, and the other end may be fastened to the unmanned aerial vehicle 10 to 50. On the other end of the fastening member 521 to 525, movement permitting members 521a to 525a that permit a change in the posture of the unmanned aerial vehicles 10 to 50 within a predetermined range and are fastened with the unmanned aerial vehicles 10 to 50 may be formed. In FIG. 11, the movement permitting members 421a to 425a are exemplified as a ball joint, but a ring, an elastic member, or the like may be used as the movement permitting members 521a to 525a. Meanwhile, in FIG. 11, the fastening members 521 to 525 are exemplified as extending in the downward direction, but the fastening members 421 to 425 may extend in the upward direction and be fastened to the unmanned aerial vehicles 10 to 50 located at the upper portion.

The disclosed embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. An apparatus for assisting formation flight comprising:
   a formation maintaining member for maintaining formation of a plurality of unmanned aerial vehicles in flight and having connection points formed at points corresponding to positions of each unmanned aerial vehicle on the formation;
   a plurality of fastening members, in which one end is connected to the connection points of the formation maintaining member and the other end is fastened to the unmanned aerial vehicle to connect the formation maintaining member and the plurality of unmanned aerial vehicles, wherein a movement permitting member for permitting a posture change of the unmanned aerial vehicle within a predetermined range is formed on the other end of the plurality of fastening members; and a goods loading unit having a plurality of sidewalls formed between adjacent fastening members, and a seating surface formed in a space surrounded by edges of the formation maintaining member, wherein the formation maintaining member has edge lines connecting the connection points and inner hollow surrounded by the edge lines, wherein the formation maintaining member is not an article carried by unmanned aerial vehicles and is fixedly connected to the fastening members, and wherein the goods seated in the goods loading unit are delivered using the plurality of unmanned aerial vehicles maintaining the formation.

2. The apparatus of claim 1, wherein the fastening member extends upward from the connection point, and is fastened to the unmanned aerial vehicle located above the formation maintaining member.

3. The apparatus of claim 1, wherein at least one of the sidewall and the seating surface is a net.

4. The apparatus of claim 1, wherein the formation maintaining member has a shape of a regular polygonal, and the connection point is formed at each vertex of the regular polygon.

5. The apparatus of claim 1, wherein the movement permitting member is a ball joint, wherein the unmanned aerial vehicle and the fastening member are fastened by coupling using the ball joint.

6. The apparatus of claim 1, wherein the movement permitting member is a ring, wherein the unmanned aerial vehicle and the fastening member are fastened by coupling using the ring.

7. The apparatus of claim 1, wherein the movement permitting member is an elastic member having a predetermined elastic force, wherein the unmanned aerial vehicle and the fastening member are fastened by coupling using the elastic member.

* * * * *